Nov. 29, 1966  R. L. A. GOUIN  3,288,396
AIRCRAFT HAVING DISC-SHAPED ROTATING WINGS
Filed Dec. 2, 1964  3 Sheets-Sheet 1
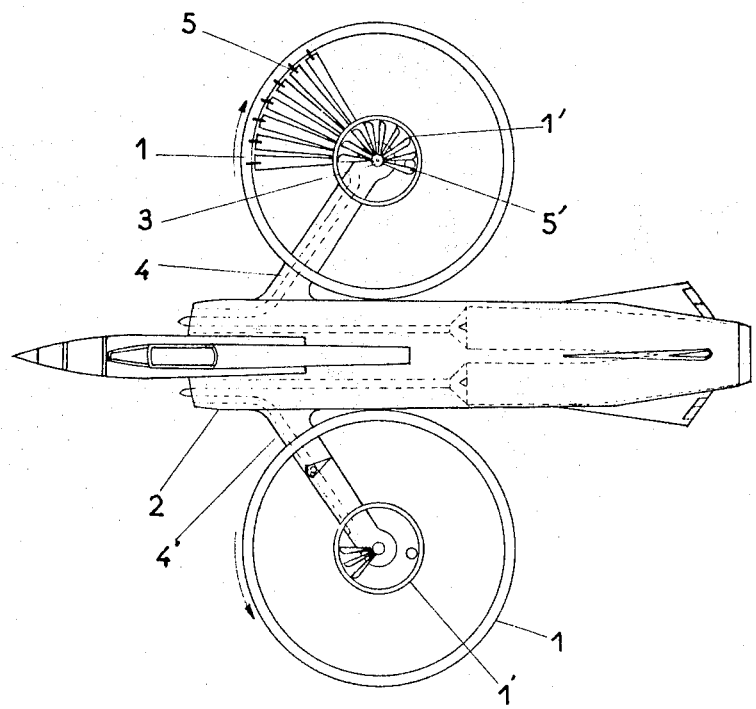
Fig: 1

Nov. 29, 1966    R. L. A. GOUIN    3,288,396
AIRCRAFT HAVING DISC-SHAPED ROTATING WINGS
Filed Dec. 2, 1964    3 Sheets-Sheet 2
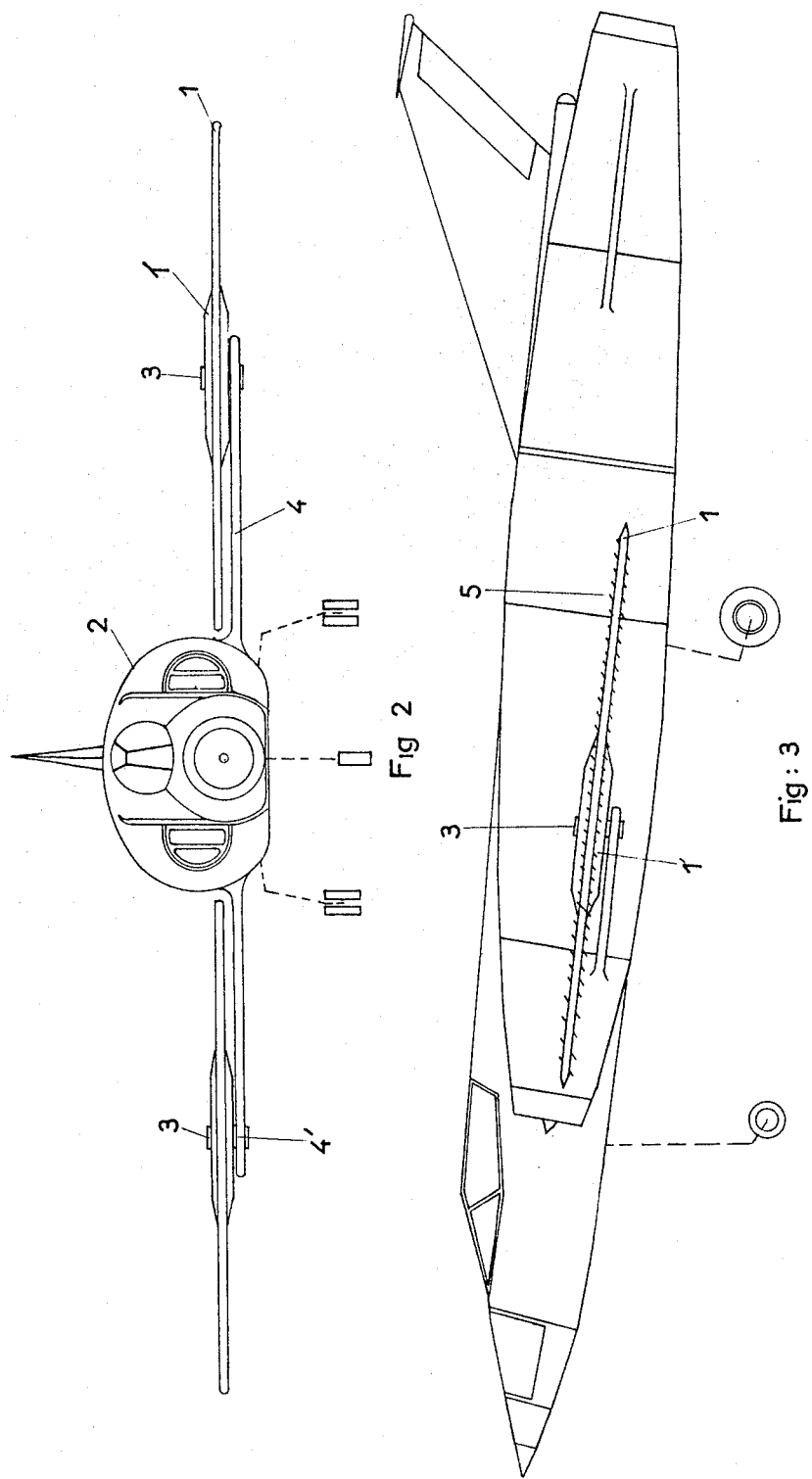

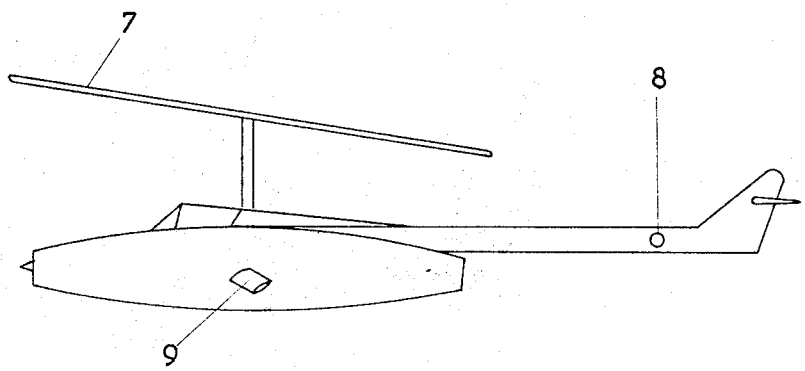
Fig: 4
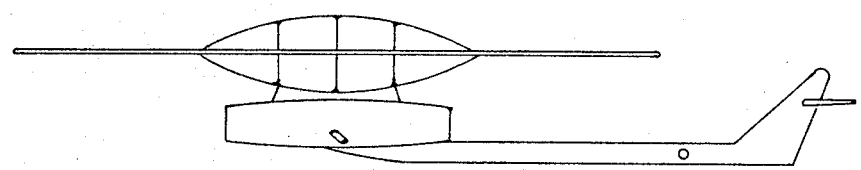
Fig: 5

United States Patent Office 3,288,396
Patented Nov. 29, 1966

3,288,396
AIRCRAFT HAVING DISC-SHAPED
ROTATING WINGS
Robert Léon Auguste Gouin, 50 Ave. de Paris,
Niort-Deux-Sevres, France
Filed Dec. 2, 1964, Ser. No. 415,443
Claims priority, application France, Dec. 12, 1963,
956,985, Patent No. 1,388,815
1 Claim. (Cl. 244—17.23)

It is an established fact that the resistance offered by a fluid to the displacement of a moving body in said fluid, increases by reason of speed square, according to formula $R=KSV^2$ (which is perhaps not absolute, but is still valid, nevertheless).

It may be acknowledged that the greater the speed of the moving body, the more does the fluid against which the moving body strives, tend to press against the latter as a compact body into which said body must penetrate, and consequently all the more pushing power is needed to allow this penetration into the fluid.

In this connection, it should be observed, for instance, that the knife would be useless if a controlling movement were not applied to it, i.e., the disk of a ham-slicing machine would be useless if it did not have a rotary movement; it would be the same with regard to a circular saw, a chopping machine and many other examples which demonstrate that to obtain penetration without undue effort it is necessary to give the moving body a rotary movement: chopping or sawing.

Now, ever since aviation came into existence, it has been observed that with regard to the wings of these machines, they are always immobile and consequently are always a great hindrance to the displacement of the machine in the atmosphere.

One of the aims of the invention is to increase the penetration coefficient of the machine in the atmosphere.

Another aim of the invention is to reduce the power thrust required for the displacement of the machine.

Another aim of the invention is to increase the speed output of the machine.

Another aim of the invention is to assist take-off and landing of the machine.

An airplane in accordance with the invention is depicted, as a non-restrictive example, in attached drawings, in which:

FIGURE 1 shows a diagrammatic view from above of an airplane whose aero-airfoils comply with the invention.

FIGURE 2 shows a front view of FIGURE 1.

FIGURE 3 gives a profile view of an airplane complying with the invention.

FIGURE 4 shows a machine complying with the invention according to a variation of the model.

FIGURE 5 shows a cabin machine with disk rotating around the cabin.

The invention works in this fashion: If you take a stiff cardboard disk and throw it into the air with a fast rotary movement, it may be seen that it glides very well and that accordingly it can travel a certain distance, with a minimum throwing effort.

The invention derived from this principle resides in the fact that some kind of movement is given to otherwise immobile appurtenances, provided that the movement be adapted to the type of displacement.

To illustrate this principle in a workable manner, reference is made to the following example.

Referring to the invention, revolving disks 1 and 1' both animated with a rotary movement, are substituted for the immobile wings of a machine such as an airplane.

These disks are placed on either side of a machine 2 and are held in place horizontally by axles 3 connecting them to support-struts 4 and 4'.

It is quite obvious that these support-struts are of an essentially reduced volume so as not to impede the principle of the invention.

The aerofoils are composed of two disks 1 and 1' placed coaxially one with the other and having rims at their outermost ends.

So as to facilitate take-off and landing of the machine, disks 1 and 1' have multiple vanes 5, the latter being adjustable by means of cams or rollers, the rotation of these vanes allowing the machine to rise like a vertical take-off machine or to take-off at low speed over a short distance.

It is to be observed that the vanes, closed during horizontal flight, present absolutely smooth, airtight surfaces so as to facilitate air-flow currents. (Outline given to disk should be studied with regard to blast).

An appropriate toothed edge could also be provided on the periphery of the disk, which would improve penetration coefficient, playing the part of a saw.

Furthermore, these disks turn in an inverse sense, in such a way that gyroscopic coupling is eliminated.

The opening and closing of these vanes controls the take-off and landing angles of the machine.

Rotation of disks is obtained by synchronized turbine engines.

These disks, actioned by a rotary movement, allow the machine to cleave the air and increase its penetration coefficient, so as to augment its speed output.

According to another example with a variation of the model, as shown at FIGURE 4, a device can also be of a parasol type with a single disk, actioned by jet-propulsion.

A compensatory device 8 of gyroscopic coupling by auxiliary jet-pipe can be placed in the tail of the machine.

A device composed of swivelling jet-pipes 9 controlled by the pilot, replaces the role played by wing-tips to ensure the swinging of machine to right or left.

The actioning of the disk can be accomplished by turbine or any other such means.

According to another example such as that shown in FIGURE 5, the machine can have a built-in cabin, the latter being placed in the center of the rotary disk.

Of course, the cabin is immobile and the disk turns around it.

Compensation of gyroscopic coupling and tilt of the machine are achieved in this case according to the same principle as above.

It should be understood that the invention is not limited to the examples described and depicted above; other ways of actioning vanes or disks could be provided, without going beyond the limits of the invention.

What I claim is:

An airplane comprising a fuselage, means on opposite sides of said fuselage for supporting a pair of disc-shaped rotary aerofoils, each of said aerofoils comprising a plurality of radially extending inner vanes, rim means, and a plurality of radially extending outer vanes, having their outermost ends connected to said rim means for rotation therewith, said inner and outer vanes being supported for rotation in a common plane and about a common axis, said outer vanes being rotatable about radially extending axes, respectively, to vary the pitch thereof relative to the plane of rotation of said aerofoils, and means supported by said fuselage for rotating said aerofoils.

References Cited by the Examiner
UNITED STATES PATENTS

| 1,264,152 | 4/1918 | Briggs | 244—39 |
| 2,402,957 | 7/1946 | Geddes | 244—39 |
| 2,529,033 | 11/1950 | Linville | 244—17.19 |
| 2,711,295 | 6/1955 | Peterson | 244—17.19 |

MILTON BUCHLER, Primary Examiner.

L. C. HALL, Assistant Examiner.